(12) United States Patent
Jenaiah

(10) Patent No.: US 12,722,483 B2
(45) Date of Patent: Sep. 1, 2026

(54) MOTOR VEHICLE

(71) Applicant: Bayerische Motoren Werke Aktiengesellschaft, Munich (DE)

(72) Inventor: Ali Jenaiah, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/850,130

(22) PCT Filed: Apr. 24, 2023

(86) PCT No.: PCT/EP2023/060653
§ 371 (c)(1),
(2) Date: Sep. 24, 2024

(87) PCT Pub. No.: WO2023/232352
PCT Pub. Date: Dec. 7, 2023

(65) Prior Publication Data

US 2025/0214431 A1 Jul. 3, 2025

(30) Foreign Application Priority Data

May 31, 2022 (DE) .................... 10 2022 113 722.8

(51) Int. Cl.
*B60K 35/231* (2024.01)
*B60K 35/215* (2024.01)
*B60K 35/23* (2024.01)
*B60K 35/50* (2024.01)
(Continued)

(52) U.S. Cl.
CPC .......... *B60K 35/231* (2024.01); *B60K 35/215* (2024.01); *B60K 35/23* (2024.01); *B60K 35/50* (2024.01); *B60K 37/10* (2024.01); *B60K 37/20* (2024.01); *B60K 2360/688* (2024.01); *B60K 2360/816* (2024.01)

(58) Field of Classification Search
CPC ................ B60K 35/231; B60K 35/215; B60K 2360/688; B60K 2360/816
See application file for complete search history.

(56) References Cited

U.S. PATENT DOCUMENTS

2008/0099521 A1* 5/2008 Huang .................... B60R 11/04 224/483
2017/0082856 A1* 3/2017 Satou .................. B60K 35/231
2023/0249754 A1* 8/2023 Testa ........................ B60H 1/28 296/192

FOREIGN PATENT DOCUMENTS

DE 10 2005 031 357 A1 1/2006
DE 10 2013 212 878 A1 1/2015
DE 10 2016 122 418 A1 5/2018
(Continued)

OTHER PUBLICATIONS

International Search Report (PCT/ISA/210) issued in PCT Application No. PCT/EP2023/060653 dated Jul. 28, 2023 with English translation (5 pages).
(Continued)

*Primary Examiner* — Nasim N Nirjhar
(74) *Attorney, Agent, or Firm* — Crowell & Moring LLP

(57) ABSTRACT

A motor vehicle includes a body in the region below the front windshield pane of which a front pane base is defined, an instrument panel mounted to the body, and a support frame that extends along the front pane base. At least one imaging unit is arranged in the support frame. The support frame is mounted to the body.

12 Claims, 3 Drawing Sheets

(51) Int. Cl.

| | |
|---|---|
| ***B60K 37/10*** | (2024.01) |
| ***B60K 37/20*** | (2024.01) |

(56) References Cited

FOREIGN PATENT DOCUMENTS

| | | | | |
|---|---|---|---|---|
| DE | 102017009668 | A1 * | 4/2019 | ........... B62D 65/028 |
| DE | 10 2017 011 493 | A1 | 6/2019 | |
| DE | 10 2017 109 022 | B4 | 9/2019 | |
| DE | 10 2017 011 493 | B4 | 10/2020 | |
| DE | 10 2020 130 400 | A1 | 5/2022 | |
| FR | 3 051 429 | A1 | 11/2017 | |
| WO | WO-2021010123 | A1 * | 1/2021 | ............. B60K 35/60 |

OTHER PUBLICATIONS

German-language Written Opinion (PCT/ISA/237) issued in PCT Application No. PCT/EP2023/060653 dated Jul. 28, 2023 with English translation (9 pages).

German-language Search Report issued in German Application No. 10 2022 113 722.8 dated Jan. 26, 2023 with partial English translation (10 pages).

* cited by examiner

Fig. 1
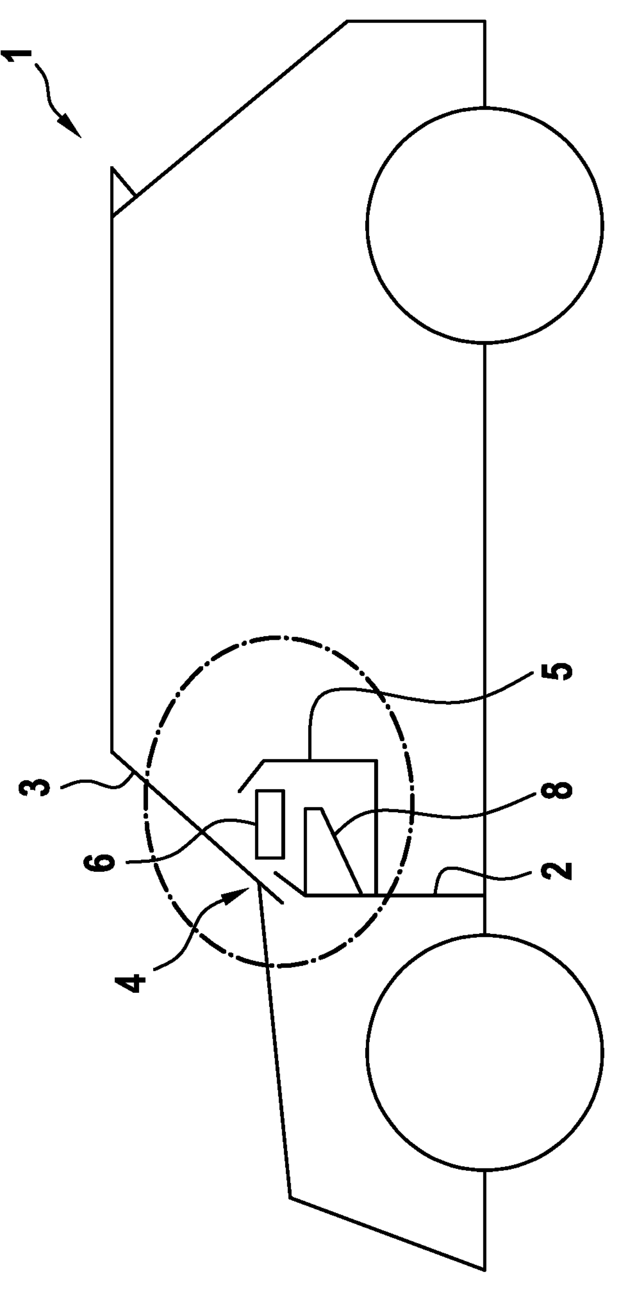
1
5
3
8
6
2
4

MOTOR VEHICLE

BACKGROUND AND SUMMARY

The present invention relates to a motor vehicle and describes the arrangement and fastening of at least one imaging unit.

The prior art discloses installing one or more imaging units, for example displays, in instrument panels of a motor vehicle. The inclusion of these imaging units in the instrument panel enables a simple fastening at the desired position and a simple assembly process, since the imaging units can thus be assembled together with the instrument panel in the body. However, in particular in the case of imaging units which project onto the windshield (head-up display), relatively accurate positioning relative to the body or relative to the windshield is required.

It is therefore an object of the present invention to provide a motor vehicle which enables the most positionally-accurate positioning of an imaging unit. Furthermore, it is the object of the present invention to provide a method for producing the motor vehicle.

This object is achieved by the features of the independent claims. The dependent claims provide preferred embodiments of the invention.

The invention discloses a motor vehicle. This is in particular a two-track road vehicle, for example a car or truck. The vehicle comprises a body. The body has a customary cutout for insertion of the windshield. A so-called windshield base is defined in the lower region of the windshield.

An instrument panel is located in the motor vehicle, that is to say in the interior of the body. This instrument panel is fastened to the body. The instrument panel can also be referred to as a dashboard. Different display elements and operator control elements for the motor vehicle can be arranged in this instrument panel.

As described in the introduction, at least one imaging unit which projects onto the windshield (head-up display) can be located in a conventional instrument panel. In the context of the invention, provision is made for a dedicated carrier frame, which preferably extends along the windshield base, to be used in addition to the instrument panel. At least one imaging unit is located in this carrier frame, for example in order to present the speed of the vehicle, information from a navigation device, images, videos or other information. This of course does not rule out other imaging units, in particular those which do not project onto the windshield, being located in the instrument panel.

In the context of the invention, provision is made for the carrier frame to be fastened to the body. The carrier frame is not, or not exclusively, fastened to the instrument panel. Provision is in particular made for the carrier frame to be fastened directly to the body. This "direct" fastening should be understood to mean that the carrier frame is preferably not fastened to assemblies (for example of the instrument panel) which fulfill other functions. However, the direct fastening of the carrier frame to the body does not rule out that the body has corresponding holding devices to which the carrier frame is fastened.

Provision is preferably made for the body to comprise at least one holding device. In particular, multiple ones of these holding devices are arranged next to one another along the vehicle width. For the sake of simplicity, the formation of only one holding device is described for the most part below. However, provision is always made for all the holding devices used to be formed accordingly for the carrier frame.

The respective holding device comprises a first holding element and is extended by a second holding element as required to extend the image size of the imaging units and/or to maintain the position and tolerance accuracy. The first holding element is fixed to the body and thus fastened, in particular welded, to the rest of the body. Since the holding device is a constituent part of the body, the expression "rest of the body" is used in the present case to describe the body exclusive of the holding device.

The second holding element is fastened to the first holding element. For example, the second holding element is welded to the first holding element. As will be explained in even more detail in the context of the method according to the invention, the second holding element is adjusted relative to the rest of the body and then the second holding element is fastened to the first holding element.

The carrier frame is fastened to the at least one first holding element or to the at least one second holding element. The use of the at least one holding device, in particular comprising the adjusted second holding element, makes it possible to position the carrier frame in a very positionally accurate manner relative to the body and thus also relative to the windshield. The at least one imaging unit is correspondingly also positioned accurately relative to the body and relative to the windshield. As a result, it is for example possible to project a very sharp and accurately positioned image onto the windshield.

The instrument panel is preferably also fastened to the body. For this purpose, the instrument panel may also be fastened to the described first or second holding element and/or to other regions of the body.

The carrier frame preferably extends over a substantial region of the width of the vehicle interior. In order to define this "substantial" region, provision is preferably made for the carrier frame to extend over at least 25%, preferably over at least 50%, of the vehicle width. The vehicle width is in particular defined as customary exclusive of the exterior mirrors.

Imaging units of variable number and dimensions are located in the carrier frame. These imaging units embodied in accordance with the requirements in terms of their number and dimensions are preferably arranged next to one another along the vehicle width.

As a result, it is possible to project one or more images onto the windshield over a very large region of the vehicle width.

The individual imaging unit preferably comprises a display. In addition or as an alternative, the individual imaging unit may for example also comprise a laser or another light-generating element which makes it possible to present an image on the windshield.

The invention further comprises a method for producing a motor vehicle, this preferably being the motor vehicle described above. In the context of the method, at least the following steps are provided:

First, a body is provided, on which a windshield base is defined in the region below the windshield.

A carrier frame is then fastened to the body. The carrier frame extends in particular along the windshield base. At least one imaging unit is located in the carrier frame. The imaging unit or the multiple imaging units are preferably designed and arranged as described above.

An instrument panel is also fastened to the body. Provision is particularly preferably made for the instrument panel to be fastened to the body after the carrier frame has been fastened to the body.

As described above in the context of the motor vehicle according to the invention, at least one holding device is preferably used. In the context of the method according to the invention, provision is preferably also made for such a holding device comprising first and second holding element to be able to be used. The step for fastening the carrier frame to the body preferably comprises the following substeps:

First, the body is prepared by the production of a first holding part. When a second holding element is used, the second holding element is adjusted relative to the rest of the body.

The second holding element is then fastened to the first holding element. In particular, the second holding element is welded, screwed or connected in some other way in accordance with the requirements to the first holding element.

In the next step, the imaging units are assembled on the carrier frame, before the combination of carrier frame and imaging units is fastened to the first or, if required, the second holding element. In this case, if required, the second holding element is first fastened to the first holding element and only then is the carrier frame fastened to the first or the second holding element. If multiple holding devices are used, all of the second holding elements are first adjusted and fastened and only then is the carrier frame fastened to the multiple holding elements.

Provision is particularly preferably made for the body to already be completely constructed when the second holding elements are adjusted. As a result, particularly accurate adjustment of the second holding elements relative to the rest of the body and not only relative to an assembly of the body is possible.

The invention discloses, with the carrier frame, a new additional component which enables the integration of imaging units which are close to the window in the motor vehicle. The use of the dedicated carrier frame and its direct fastening to the body also make it possible to adopt high requirements in terms of acoustics and further geometrical or functional additions. The free choice of material for the carrier frame makes it possible to satisfy corresponding stiffness requirements and appropriate surface qualities, which can therefore also avoid, in particular, undesired light reflections.

Further details, features and advantages of the invention will emerge from the following description and from the figures.

BRIEF DESCRIPTION OF THE DRAWINGS

FIG. 1 is a schematic view of a motor vehicle according to an exemplary embodiment of the invention;

DETAILED DESCRIPTION OF THE DRAWINGS

Figure 2:
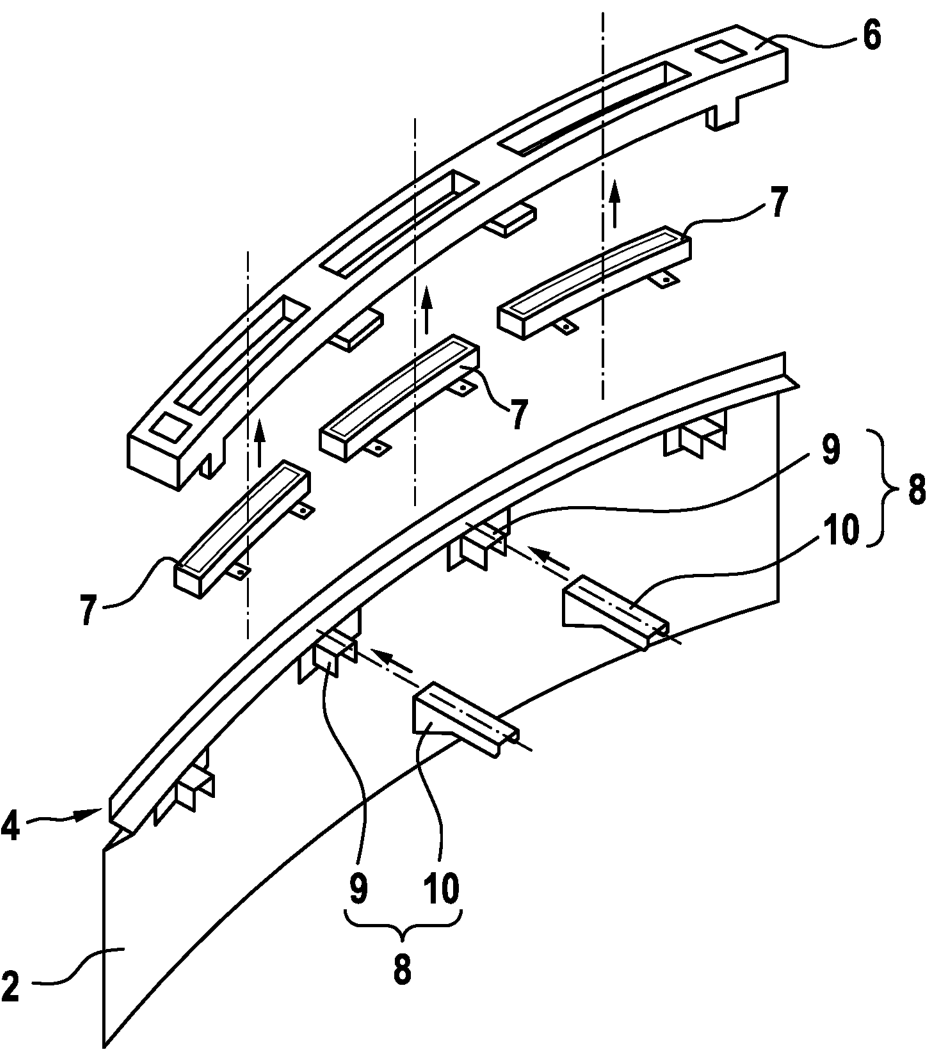
FIG. 2 is a schematic exploded view of a detail of the motor vehicle according to the exemplary embodiment.

The structure of the motor vehicle according to an exemplary embodiment is described purely schematically below with reference to FIGS. 1 and 2. The schematic illustration in the figures is limited to the components that are essential in the context of the present invention.

According to the schematic illustration in FIG. 1, the motor vehicle 1 is in the form of a car. The motor vehicle 1 comprises a body 2 and a windshield 3. A windshield base 4 is defined in the lower region of the windshield 3 or at the transition of the windshield 3 to the body 2.

An instrument panel 5 and a carrier frame 6 are located in the region of the windshield base 4.

The instrument panel 5 extends over a substantial region of the vehicle interior. Corresponding display and operator control elements can be arranged in the instrument panel 5.

FIG. 2 shows a schematic exploded view of the vehicle 1 in the region of the windshield base 4. The end wall of the body 2, the carrier frame 6 and multiple imaging units 7 are shown. As illustrated in the illustration in FIG. 2, multiple (in the shown exemplary embodiment three) imaging units 7 are arranged in the carrier frame 6. The imaging units 7 are displays which can project a corresponding image onto the inner side of the windshield 3. For the sake of clarity, the instrument panel 5 is hidden in FIG. 2.

Provision is in particular made for the imaging units 7 to not be integrated into the instrument panel 5 and to not be fastened to the instrument panel 5. Rather, the carrier frame 6 is fastened directly to the body 2. For this purpose, multiple holding devices 8 are used.

As illustrated in FIG. 2, the individual holding device 8 comprises a first holding element 9 and a second holding element 10. The first holding element 9 is fixedly connected to or formed integrally with the rest of the body 2. The second holding element 10 is fastened, in particular welded, to the first holding element 9. The carrier frame 6 is in turn fastened to the second holding elements 10 and possibly to further positions of the body 2.

Figure 3:
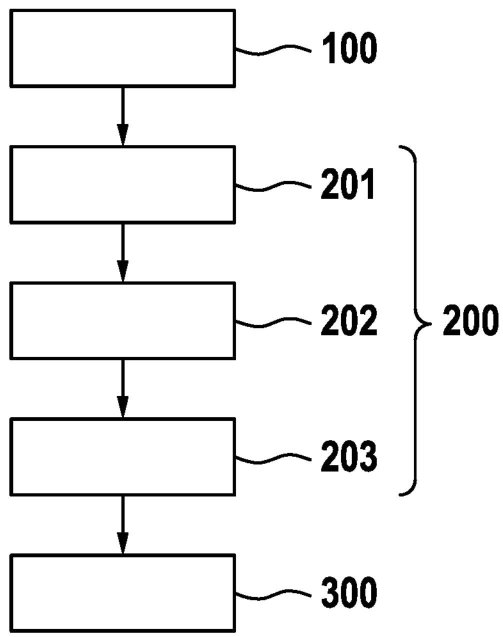
FIG. 3 is a schematic method sequence for producing the motor vehicle.

FIG. 3 purely schematically illustrates the sequence of the method for producing the described motor vehicle 1.

In method step 100, the body 2 is first provided, on which the windshield base 4 is defined in the region below the windshield 3.

In the method step 200, the carrier frame 6, including the preassembled imaging units 7, is fastened to the body 2. For this purpose, in method step 201, the second holding elements 10 are first adjusted relative to the rest of the body 2 and, in method step 202, fastened to the first holding elements 9. Then, in method step 203, the carrier frame 6, including the preassembled imaging units 7, is fastened to the second holding elements 10 and thus the carrier frame 6, including the preassembled imaging units, is fastened to the body 2.

It is only then that the instrument panel 5 is fastened to the body 2 in method step 300.

LIST OF REFERENCE DESIGNATIONS

1 Motor vehicle
2 Body
3 Windshield
4 Windshield base
5 Instrument panel
6 Carrier frame
7 Imaging unit
8 Holding device
9 First holding element
10 Second holding element
100-300 Method steps

The invention claimed is:

1. A motor vehicle, comprising:

a vehicle body, on which a windshield base is defined in a region below a windshield of the vehicle;

a dashboard fastened to the body;

a carrier frame extending along the windshield base, wherein the carrier frame is fastened within the dashboard directly to the body and to a windshield base region of the body; and at least one head-up display imaging unit arranged in the carrier frame and configured to project an image onto the windshield.

2. The motor vehicle according to claim 1, wherein the body comprises at least one holding device, each individual holding device comprises a first holding element and an adjusted second holding element fastened to the first holding element, and the carrier frame, including one or more preassembled imaging units, is fastened to the second holding element.

3. The motor vehicle according to claim 2, wherein the dashboard is fastened to the first holding element and/or to other regions of the body.

4. The motor vehicle according to claim 1, wherein the carrier frame extends over at least 25% of a width of the motor vehicle.

5. The motor vehicle according to claim 1, wherein the carrier frame extends over at least 50% of a width of the motor vehicle.

6. The motor vehicle according to claim 1, wherein at least one or multiple imaging units are arranged in the carrier frame.

7. The motor vehicle according to claim 6, wherein the multiple imaging units are arranged next to one another along a width of the motor vehicle.

8. The motor vehicle according to claim 1, wherein the at least one imaging unit is arranged, and configured, for projecting onto the windshield.

9. The motor vehicle according to claim 1, wherein the at least one imaging unit comprises a display.

10. A method for producing a motor vehicle, the method comprising the steps of:

providing a vehicle body, on which a windshield base is defined in a region below a windshield;

fastening a carrier frame directly to the body and to a windshield base region of the body, wherein the carrier frame extends along the windshield base, and wherein at least one head-up display imaging unit is arranged in the carrier frame and configured to project an image onto the windshield; and after fastening the carrier frame directly to the body, fastening a dashboard to the body.

11. The method according to claim 10, wherein the carrier frame is fastened within the dashboard directly to the body.

12. The method according to claim 10, wherein at least one holding device comprising a first holding element and a second holding element is used, wherein, in order to fasten the carrier frame to the body, the method further comprises, in order, the steps of:

adjusting the second holding element relative to the rest of the body;

fastening, via welding, the second holding element to the first holding element; and fastening the carrier frame to the second holding element.

* * * * *